O. M. PADDLEFORD.
LOCK.
APPLICATION FILED MAR. 22, 1920.
1,383,562.
Patented July 5, 1921.
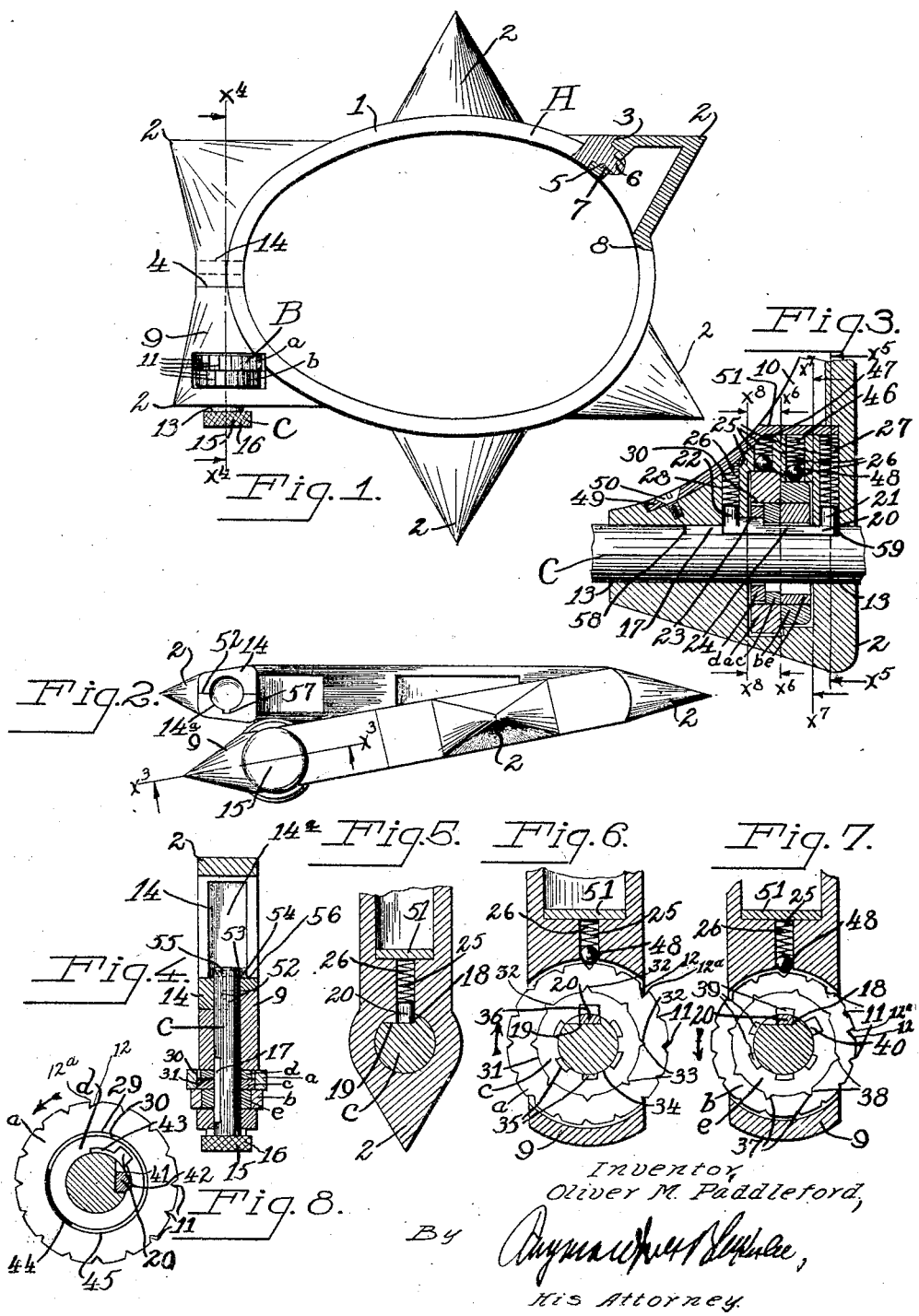
Inventor,
Oliver M. Paddleford,
By
His Attorney.

UNITED STATES PATENT OFFICE.

OLIVER M. PADDLEFORD, OF LOS ANGELES, CALIFORNIA.

LOCK.

1,383,562.   Specification of Letters Patent.   Patented July 5, 1921.

Application filed March 22, 1920. Serial No. 367,698.

*To all whom it may concern:*

Be it known that I, OLIVER M. PADDLEFORD, a citizen of the United States, residing at Los Angeles, in the county of Los Angeles and State of California, have invented new and useful Improvements in Locks, of which the following is a specification.

This invention relates to locks and more particularly to combination locks or change combination locks, for general purposes of establishing and maintaining security, although the invention is shown as applied and adapted for the purpose of maintaining in locked condition an auto theft signal device of a type which has been commercially employed to some extent. It will be understood that the invention is not limited in its pertinence to any particular use or adaptation.

The invention has for its object to provide an improved lock which will be superior in point of relative simplicity and inexpensiveness in construction and organization, taken in conjunction with positiveness and effectiveness in operation, proof against tampering by unauthorized persons, facility in assembling and disconnecting of parts, and in repairs and replacements thereof, and which will be generally superior in efficiency and serviceability.

The invention further consists in the novel and useful provision, combination, construction, relative arrangement, mode of operation and inter-relation of parts, members and features, all as hereinafter described, shown in drawing, and finally pointed out in claims.

In the drawing:

Figure 1 is a plan view of an auto theft or signal device with the improved lock member shown in conjunction therewith;

Fig. 2 is an edge view of the device shown in Fig. 1; likewise showing the two operable parts moved to show the method of placing the signal device upon a tire;

Fig. 3 is a detail, fragmentary, cross-sectional view, taken on the line $x^3-x^3$, Fig. 2, and looking in the direction of the appended arrows;

Fig. 4 is a detail cross-sectional view of the lock member taken on the line $x^4-x^4$, Fig. 1, and looking in the direction of the appended arrows;

Fig. 5 is a fragmentary cross-sectional view taken on the line $x^5-x^5$, Fig. 3.

Fig 6 is a fragmentary cross-sectional view showing certain operating parts of the lock member and taken on the line $x^6-x^6$, Fig. 3, and looking in the direction of the appended arrows;

Fig. 7 is a fragmentary cross-sectional view of another lock member shown in practising this invention, taken on the line $x^7-x^7$, Fig. 3, and looking in the direction of the appended arrows; and Fig. 8 shows one of the annular lock members used in practising the invention and taken on the line $x^8-x^8$, Fig. 3, and looking in the direction of the appended arrows.

Corresponding parts in all the figures are designated by the same reference characters.

Referring with particularity to the drawing, A designates an auto theft or signal device; B, a locking means; and C a bolt used in conjunction with the locking means and the auto theft member A, all of which elements are used in practising one embodiment of the invention.

The signal member A includes a yoke 1 having one of the peripheral surfaces thereof outwardly depending pointed members 2. The yoke member 1 is of such a shape that it may completely incase both the rim and the tire of an automobile or other vehicle wheel. The yoke member 1 is likewise divided at two points as 3 and 4. One portion of the yoke member 1 as at 5 is provided with an outwardly extending pin 6, which pin is accommodated within a perforation 7 of a portion of the yoke member as 8. When the yoke member 1 is not locked at 4, the parts 8 and 5 of the yoke 1 may be rotated in order to fit the signal device A around a tire.

The particular signal device A shown is not a feature of this invention, but the means such as the lock member B used in maintaining the signal device A in position upon the tire is what is desired and described as the main feature of the invention.

The lock member B is accommodated within one of the pointed members 2 as at 9, and which member acts as a lock casing for the lock B. The pointed member 2 shown at 9 and accommodating the lock member B is hollow, as at 10, to accommodate the internal workings of the lock member B.

The lock member B comprises two rotatable members $a$ and $b$ provided with a series of transversely notched portions 11 located on the periphery thereof and one of which notched portions has an abrupt wall as at 12 for purposes about to be explained. It will be observed by referring to Fig. 1 as well as Fig. 3, that the annular lock member $a$ is of greater diameter than the annular lock member $b$. While the members are made this way, it is not absolutely essential that one be of greater diameter than the other, but the difference in diameter aids in distinguishing between the two in operating the combination.

The pointed member 2 shown at 9 has as at 13 a cylindrical bore extending therethrough and into the pointed member 2 shown at 14; within this bore there is accommodated the bolt C and which bolt is capable of being partly rotated as well as axially shifted within the cylindrical bore 13. The bolt C is provided with a head 15, corrugated or knurled as at 16, so as to give a gripping surface for the fingers. The bolt C is further provided with a longitudinal notched portion 17 extending on the peripheral surface thereof. The notched portion has an abrupt wall 18 and a portion 19 which opens outwardly at the other side.

A key 20 elongated in form is capable of sliding within the notched portion 17 and being dislocated from same when the bolt C is permitted to rotate. The key 20 has at its ends angularly disposed extremities 21 and 22. The key is further stepped as at 23 and 24, the step 24 being longer than the step 23.

The point 2 shown at 9 and which point as before mentioned acts as a lock casing is provided with a plurality of vertically extending sockets 25 and within which sockets are resilient means 26. The angularly disposed extremities 21 and 22 of the key 20 extend upwardly within two of the vertically extending sockets 25 as at 27 and 28 respectively. The resilient means 26 bears downwardly upon the angularly disposed extremities of the key and normally keeps the key member 20 in an upright position, co-acting with the notch 17 as well as the peripheral surface of the bolt C while same is being rotated. If it were not for the resilient means 26 the key 20 would tend to be displaced from the vertically extending sockets and might possibly render the lock ineffective.

The annular lock members $a$ and $b$, which comprise a main portion of the lock B, are provided with co-acting concentric members which form the main feature of this invention. The annular lock member $a$ is made to include two internal working parts $c$ and $d$ and the lock member $b$ with one internal working part $e$. The annular lock member $a$ is made in ring formation as shown at 29 and the inner peripheral surface thereof as at 30 is smooth and loosely accommodates the portion $d$ while that portion of the annular lock member $a$ shown at 31 accommodates the member $c$. The member $c$ is provided with outwardly extending stop projections 32 which co-act with correspondingly notched portions 33 in the member $a$. The member $c$ is likewise made in a ring formation and the inner marginal wall of same, as at 34, is provided with relatively shallow recesses or notches 35 of a sufficient width but not depth to accommodate the key 20, while one notch, as at 36, is made of a sufficient depth and width to accommodate the key 20.

The annular lock member $b$ is in all details of construction the same as the member $a$ with the exception that it has but one internal working member $e$, which member is held in relation to the member $b$ by means of the projections 37 extending in recessed portions 38 of the member $b$. And the member $e$ is likewise provided with a series of notches or recesses 39 upon the inner margin or wall of same, one of which notches, as at 40, is made of sufficient depth and width to accommodate the key 20.

Referring to Fig. 8 it will be observed that the member $d$ incased within the member $a$ is provided with a notch 41 located on the inner margin or wall of same, and which notch is of a sufficient depth to accommodate the raised portion 23 on the key 20. The immediate portions adjacent to the notch 41 are slightly recessed as at 42 and 43 but further than this no notches similar to 42 or blind notches such as were shown on the members $c$ and $e$ are provided.

As has been before mentioned, the member $d$ is loosely surrounded by the member $a$, but to render the lock more effective it has been found advisable to incase a small spring 44 within a portion 45 so that the member $d$ may be in frictional engagement with the inner marginal wall of the member $a$.

It will be observed by referring to Fig. 3 as well as Figs. 6 and 7, that when the annular locking members $a$ and $b$ are incased within the lock casing shown at 9, and held in relation thereto by the bolt C, that further resilient means 26 are placed within the vertically extending sockets 25 shown at 46 and 47 and which bear upon dogs or balls 48, which balls in turn bear upon the peripheral notched surface of the annular locking members *a* and *b* respectively. In order to retain all parts in position, so that they will at all times co-act with their corresponding members, a plate 49 held in position upon the yoke 1 by means of a screw 50, is provided. This plate 49 corresponds in general contour and shape to the inner surface of the yoke 1; and which plate 49 has a portion as at 51 angularly disposed and coöperating with the lock casing so as to hold the resilient means in position.

The portion 14 shown in one of the members 2 is provided with an internal bore 14$^a$ for accommodating the bolt C. When the signal member is rotated at the point 3 the signal device A parts at the point 4; and the yoke 1 at this point is so constructed that the members shown at 14 and at 9, when together, dove-tail as at 52. Quite obviously, when the signal device A is rotated into position, the dove-tailed portion 52 acts as a positive means of holding the parts 14 and 9 in close relation to one another.

The bolt C is provided on its inner end as at 53 with a projection 54 and which projection is threaded and accommodated within a correspondingly threaded portion 55 in the bolt C.

The operation is as follows:

When all the parts are in the assembled position shown both in Figs. 3 and 4, it will be observed that the recessed or notched portion 17 of the bolt C is longer than is absolutely necessary to accommodate the key 20. Obviously it is necessary to have the recessed portion longer than the key 20 in order that the bolt C may be pulled outwardly in order to release the parts 9 and 14 from each other.

Referring to Figs. 6 and 7, it will be observed that the member *a* has one notch 12 formed with an abrupt wall 12$^a$. When the ball 48 is brought into position with the abrupt walled portion 12$^a$ of the notch 12 consequent upon rotation of the annular locking member *a*, a further rotation of the locking member *a* in that direction is not permitted. Likewise, the member *b* is provided with a notch 12 having abrupt wall 12$^a$ and further rotation of the member *b* is impossible when the ball 48 comes in contact with this abrupt wall. These notches are known as the starting point. If we take the member *a* shown in Fig. 6 and commence our rotation of same in the direction shown by the arrow, we observe that moving the member *a* two notches brings the key 20 in a position with the notch 36. Suppose it were desired to change the particular combination, obviously this could be done by releasing the member *c* from the member *b* and causing the stop notches 32 to engage other recessed portions in the member *a*. Stop notches 32 are provided to correspond with every second transversely notched portion on the periphery of the member *a*. Consequently, a rotation of the member *a* will give an audible click every time the ball 48 comes in contact with one of the notches 11 and this click indicates to the operator the exact position of the notches on the interior of the lock. That is, of course, when the combination is known.

Refer now to Fig. 8, which shows the opposite side of the annular locking member *a*, that is, the portion oppositely disposed to that shown in Fig. 6. Here, it will be observed that the member *d* is not provided with stop notches 32 like the member *c*, associated with the member *a*, but on the contrary has a spring 44 co-acting with the inner marginal wall of the member *a* and the outer surface of the member *d*, and within the portion 45. The key 20, of course, must fit within the notch 41 in order to release same, therefore by turning the locking member *a* in the direction indicated by the arrow, two notches, the key 20 will be brought into position so that it may engage the notched portion 42. If it were desired to change the particular combination, in relation to the member *d*, it would only be necessary to extend the portion 43 or 41 so that it was greater or lesser in extent. To do so, of course, would require a further rotation of the member *a* in order to bring the key 20 into position with the notch 41.

Referring to Fig. 7, movement of the locking member *b* into position 12 will lock same. Then rotating the member *b* in the direction indicated by the arrow fifteen notches will bring the key 20 into a position so that it may engage the recessed portion 40.

When the notched portions 40, 36 and 41 are all in a line with one another, the key 20 upon a rotation of the bolt C will tend to be forced upward so that the bolt C may be easily rotated and moved radially, thus disengaging portions 9 and 14 of the signal lock A. At this time, the key 20 will lie on the peripheral surface of the bolt C, but until the various notches or recessed portions above mentioned are in alinement with one another, it will be impossible to rotate the bolt C, as the key member could not move upwardly within the vertically extending sockets or the recessed portions 40, 36 or 41.

It will now be easily understood why the key 20 was made in the step formation shown at 23 and 24. By having the step 23 intermediately disposed within the lock member *a*, the higher step 23 will accommodate the member *d*, and the lower step 24 will accommodate the member *c*. Thus these two members are always kept in a fixed relation to one another.

If someone were to tamper with the lock who was not familiar with the combination, it is quite possible that they would move first the member $a$ and then try turning the bolt C. If they did so, the key member 20 would immediately move upwardly into one of the blind notches 35 and give the operator the impression that this is the correct position for the member $a$. He would then move the member $b$ until he found a notch that would seem to accommodate the bolt C. If it so happened that he found the notch 40, this would not, of course, allow the bolt C to be released, as all the notches that allow releasing of the key are not in alinement.

It has been found by the inventor that it is almost impossible to determine the correct combination to the lock B. Likewise, the relation of the member $a$, $c$ and $d$ may be so changed, as well as the relation between the members $b$ and $e$, that any number of lock combinations can be made.

To work the particular combination of the lock B shown in Figs. 6, 7 and 8, proceed as follows: First so rotate members $a$ and $b$ that the balls 48 come into engagement with notches 12 and lock. Next rotate $a$ in a counter direction four notches from the lock point. This will bring the recess 36 two notches beyond the point for accommodating the key 20. Now rotate $a$ in a contrary direction two notches and the recesses 36 and 41 will then be in alinement with one another. The reason for this is apparent, for the member $d$ is always in frictional engagement with the member $a$, and the number of notches necessary to rotate the member $a$ in the direction indicated by the arrow in Fig. 8 depends upon the length of the portions 42 or 43. If, for instance, the portion 41 was increased in extent, so that the increase in distance corresponded nearly with the distance between two successive notches 11, then the combination would be—move $a$ five notches forward and three back. As shown in Fig. 8, regardless of the number of times the member $a$ is rotated, a rotation in a counter direction of two notches will always bring the key 20 in position with the recess 41.

Assuming that the member $a$ has been so rotated as to bring the recesses 36 and 41 in alinement, a rotation of the member $b$ fifteen notches will bring the recess 40 in a line with 36 and 41. Rotating the bolt C to the right, looking in the plane of the figures, will force the key 20 upward, due to the inclined plane action of the surface 19, so that the key may completely lie within recesses 36, 40 and 41, after which the key 20 will ride on the curved peripheral surface of the bolt.

When the bolt C has been rotated sufficiently, the projection 53 which engages an inner wall 56 of the portion 14 will contact with the keyway 57, permitting the bolt C to be co-axially withdrawn through the bore 13 a sufficient distance to permit a separation of parts 9 and 14 at the point 4.

A key-way corresponding to a key-way 57 is provided for a short distance in the part 9. Within this latter key-way the projection 53 fits, when the lock is in a condition to permit a separation of the parts 9 and 14. Unscrewing the projection 53 will permit the bolt C to be withdrawn from the bore 13 and thus enable one to remove the members $a$ and $b$ for adjustments, etc.

When the parts 9 and 14 are locked together, it would be impossible to remove the bolt C regardless of whether the projection 53 was in place on the bolt C or not, as the length of the portion 17 and the key 20 would regulate the co-axial distance the bolt C could be moved, inasmuch as one of the ends 21 or 22 of the key 20 would meet one of the angularly disposed walls 58 or 59 of the notched portion 17.

It is obvious that many changes and modifications may be made in practising the foregoing invention, all, however, without in any manner departing from the true spirit of the invention as above described and pointed out in the appended claims.

Having thus disclosed my invention, I claim and desire to secure by Letters Patent:

1. In an improved lock, the combination of a bolt-receiving member having a longitudinal cylindrical bore leading from its interior to its exterior, and a bolt-carrying member having a lateral slotted portion concentric with said cylindrical bore, of a bolt mounted within said bore, and having in its periphery a longitudinal notched portion, lock members located within the lateral slotted portion of the bolt-receiving member and rotatably surrounding the bolt, said lock members being provided with a plurality of internal notches, a key carried by said bolt and adapted for partial reception in said longitudinal notched portion of the bolt, and for registration with certain of the internal notches of the lock members, and means coöperating with said lock members and carried by the bolt-receiving member for indicating when the lock members have been properly set, so that the key will fall within certain of the internal notches of the lock members and permit the bolt to be rotated and axially shifted, said longitudinal notched portion in the periphery of the bolt being provided with an abrupt wall portion and a portion which opens outwardly, so that the bolt may be rotated freely in one direction but limited as to its rotation in a counter direction when the key comes into contact with the abrupt wall portion.

2. In an improved lock, the combination of a bolt-receiving member having a longitudinal cylindrical bore leading from its interior to its exterior, and a bolt-carrying member having a lateral slotted portion concentric with said cylindrical bore, of a bolt mounted within said bore, and having in its periphery a longitudinal notched portion, lock members located within the lateral slotted portion of the bolt-receiving member and rotatably surrounding the bolt, said lock members being provided with a plurality of internal notches, a key carried by said bolt and adapted for partial reception in said longitudinal notched portion of the bolt, and for registration with certain of the internal notches of the lock members, and means coöperating with said lock members and carried by the bolt-receiving member for indicating when the lock members have been properly set, so that the key will fall within certain of the internal notches of the lock members and permit the bolt to be rotated and axially shifted; said bolt being provided with a knob at its outer end, and a laterally extending projection on its inner end; said bolt-receiving member having a ring-like wall member angularly depending within and at the outer end of the cylindrical bore.

3. In an improved lock, the combination of a bolt-receiving member having a longitudinal cylindrical bore leading from its interior to its exterior, and a bolt-carrying member having a lateral slotted portion concentric with said cylindrical bore, of a bolt mounted within said bore, and having in its periphery a longitudinal notched portion, lock members located within the lateral slotted portion of the bolt-receiving member and rotatably surrounding the bolt, said lock members being provided with a plurality of internal notches, a key carried by said bolt and adapted for partial reception in said longitudinal notched portion of the bolt, and for registration with certain of the internal notches of the lock members, and means coöperating with said lock members and carried by the bolt-receiving member for indicating when the lock members have been properly set, so that the key will fall within certain of the internal notches of the lock members and permit the bolt to be rotated and axially shifted; said bolt being provided with a knob at its outer end, and a laterally extending projection on its inner end; said bolt-receiving member having a ring-like wall member angularly depending within and at the outer end of the cylindrical bore; said wall member being provided with a key-way through which, when the bolt is laterally shifted, the laterally extending projection on the bolt passes to permit the projection to engage, when the bolt is rotated, an inner surface of the ring-like wall member, thus holding the bolt-receiving member and bolt-carrying member together.

4. In an improved lock, the combination of a bolt-receiving member having a longitudinal cylindrical bore leading from its interior to its exterior, and a bolt-carrying member having a lateral slotted portion concentric with said cylindrical bore, a bolt mounted within said bore and slot, and having in its periphery a longitudinal notched portion, an annular lock member located within the lateral slotted portion of the bolt-carrying member and rotatably surrounding the bolt, said annular lock member having a plurality of internal recesses, a key carried by said bolt and adapted for partial reception in said longitudinal notched portion of the bolt, and for registration with one of the internal recesses of the annular lock member, and means coöperating with the annular lock member and carried by the bolt-carrying member for indicating when the annular lock member has been properly set, so that the key will fall within a certain internal recess of the annular lock member and permit the bolt to be rotated and axially shifted; said annular lock member having a plurality of transverse position notches on its outer peripheral edge, and the bolt-carrying member having a socket opening into the slotted portion; resilient means carried within said slotted portion, a dog extending into the socket and bearing upon the resilient means, whereby the dog will be normally urged outwardly and held in engagement with the outer peripheral edge of the annular lock member.

5. In an improved lock, the combination of a bolt-receiving member having a longitudinal cylindrical bore leading from its interior to its exterior, and a bolt-carrying member having a slotted portion concentric with said cylindrical bore, of a bolt mounted within said bore, and having in its periphery a longitudinal notched portion, annular lock members located within the slotted portion of the bolt-receiving member and rotatably surrounding the bolt, said annular lock members being provided with a plurality of internal notches, a key carried by said bolt and adapted for partial reception in said longitudinal notched portion of the bolt, and for registration with certain of the internal notches of the annular lock members and means coöperating with said lock members and carried by the bolt-receiving member for indicating when the lock members have been properly set, so that the key will fall within certain of the internal notches of the annular lock members and permit the bolt to be rotated and axially shifted; said lock members having a plurality of transverse positioning notches on their outer peripheral edges, and the bolt-carrying member having a plurality of sockets opening into the slotted portion; resilient means carried within said sockets, dogs extending into certain of the sockets and bearing upon the resilient means, whereby the dogs will be normally urged outwardly and held in engagement with the outer peripheral edges of the annular lock members.

6. In an improved lock, the combination of a bolt-receiving member having a longitudinal cylindrical bore leading from its interior to its exterior, and a bolt-carrying member having a slotted portion concentric with said cylindrical bore, of a bolt mounted within said bore and slot and having in its periphery a longitudinal notched portion, an annular lock member located within the slotted portion of the bolt-carrying member and rotatably surrounding the bolt, said annular lock member having a plurality of internal recesses, a key carried by said bolt and adapted for partial reception in said longitudinal notched portion of the bolt, and for registration with one of the internal recesses of the annular lock member, and means coöperating with the lock member and carried by the bolt-carrying member for indicating when the annular lock member has been properly set, so that the key will fall within a certain internal recess of the annular lock member and permit the bolt to be rotated and axially shifted; said annular lock member comprising concentric ring members detachably contained one within the other, an outer ring of which is transversely notched on its outer periphery, and an inner ring of which has a plurality of outward stop projections co-acting with notched portions on the inner marginal wall of the outer ring.

7. In an improved lock, the combination of a bolt-receiving member having a longitudinal cylindrical bore leading from its interior to its exterior, and a bolt-carrying member having a slotted portion concentric with said cylindrical bore, of a bolt mounted within said bore and slot and having in its periphery a longitudinal notched portion, an annular lock member located within the slotted portion of the bolt-carrying member and rotatably surrounding the bolt, said annular lock member having a plurality of internal recesses, a key carried by said bolt and adapted for partial reception in said longitudinal notched portion of the bolt, and for registration with one of the internal recesses of the annular lock member, and means coöperating with the lock member and carried by the bolt-carrying member for indicating when the annular lock member has been properly set, so that the key will fall within a certain internal recess of the annular lock member and permit the bolt to be rotated and axially shifted; said annular lock member comprising concentric ring members detachably contained one within the other, an outer ring of which is transversely notched on its outer periphery, and an inner ring of which has a plurality of outward stop projections co-acting with notched portions on the inner marginal wall of the outer ring; said inner ring likewise being provided with a plurality of recesses on its inner marginal wall, one of which recesses is deep enough to accommodate the key.

8. In an improved lock, the combination of a bolt-receiving member having a longitudinal cylindrical bore leading from its interior to its exterior, and a bolt-carrying member having a slotted portion concentric with said cylindrical bore, of a bolt mounted within said bore and slot and having in its periphery a longitudinal notched portion, an annular lock member located within the slotted portion of the bolt-carrying member and rotatably surrounding the bolt, said annular lock member having a plurality of internal recesses, a key carried by said bolt and adapted for partial reception in said longitudinal notched portion of the bolt, and for registration with one of the internal recesses of the annular lock member, and means coöperating with the lock member and carried by the bolt-carrying member for indicating when the annular lock member has been properly set, so that the key will fall within a certain internal recess of the annular lock member and permit the bolt to be rotated and axially shifted; said annular lock member comprising concentric ring members detachably contained one within the other, an outer ring of which is transversely notched on its outer periphery, and an inner ring of which has a plurality of outward stop projections co-acting with notched portions on the inner marginal wall of the outer ring; said inner ring likewise being provided with a plurality of recesses on its inner marginal wall, one of which recesses is deep enough to accommodate the key; said bolt-carrying member having a socket opening into the slotted portion, and said means coöperating with the lock member and carried by the bolt-carrying member for indicating when the annular lock member has been properly set, comprising resilient means carried within said socket and a dog extending into the socket and bearing upon the resilient means, so that the dog will be normally urged outwardly and held in engagement with the transversely notched portions in the outer peripheral edge of the outer ring member.

9. In an improved lock, the combination of a bolt-receiving member having a longitudinal cylindrical bore leading from its interior to its exterior, and a bolt-carrying member having a slotted portion concentric with said cylindrical bore, of a bolt mounted within said bore and slot and having in its periphery a longitudinal notched portion, an annular lock member located within the slotted portion of the bolt-carrying member and rotatably surrounding the bolt, said annular lock member having a plurality of internal recesses, a key carried by said bolt and adapted for partial reception in said longitudinal notched portion of the bolt, and for registration with one of the internal recesses of the annular lock member, and means coöperating with the lock member and carried by the bolt-carrying member for indicating when the annular lock member has been properly set, so that the key will fall within a certain internal recess of the annular lock member and permit the bolt to be rotated and axially shifted; said annular lock member comprising concentric ring members detachably contained one within the other, an outer ring of which is transversely notched on its outer periphery, and an inner ring of which has a plurality of outward stop projections co-acting with notched portions on the inner marginal wall of the outer ring; said inner ring likewise being provided with a plurality of recesses on its inner marginal wall, one of which recesses is deep enough to accommodate the key; said bolt-carrying member having a socket opening into the slotted portion, and said means coöperating with the lock member and carried by the bolt-carrying member for indicating when the annular lock member has been properly set, comprising resilient means carried within said socket and a dog extending into the socket and bearing upon the resilient means, so that the dog will be normally urged outwardly and held in engagement with the transversely notched portions in the outer peripheral edge of the outer ring member, one of said transversely notched portions having an abrupt wall portion which locks the annular lock member against continuous rotation in one direction when the dog comes into contact with the abrupt wall.

10. In an improved lock, the combination of a bolt-receiving member having a longitudinal cylindrical bore leading from its interior to its exterior, and a bolt-carrying member having a slotted portion concentric with said cylindrical bore, of a bolt mounted within said bore and slot and having in its periphery a longitudinal notched portion, an annular lock member located within the slotted portion of the bolt-carrying member and rotatably surrounding the bolt, said annular lock member having a plurality of internal recesses, a key carried by said bolt and adapted for partial reception in said longitudinal notched portion of the bolt, and for registration with one of the internal recesses of the annular lock member, and means coöperating with the lock member and carried by the bolt-carrying member for indicating when the annular lock member has been properly set, so that the key will fall within a certain internal recess of the annular lock member and permit the bolt to be rotated and axially shifted; said annular lock member comprising concentric ring members detachably contained one within the other, an outer ring of which is transversely notched on its outer periphery, and an inner ring of which has a plurality of outward stop projections co-acting with notched portions on the inner marginal wall of the outer ring; said inner ring likewise being provided with a plurality of recesses on its inner marginal wall, one of which recesses is deep enough to accommodate the key; said bolt-carrying member having a socket opening into the slotted portion, and said means coöperating with the lock member and carried by the bolt-carrying member for indicating when the annular lock member has been properly set, comprising resilient means carried within said socket and a dog extending into the socket and bearing upon the resilient means, so that the dog will be normally urged outwardly and held in engagement with the transversely notched portions in the outer peripheral edge of the outer ring member; one of said transversely notched portions having an abrupt wall portion which locks the annular lock member against continuous rotation in one direction when the dog comes into contact with the abrupt wall; said contact point acting as a starting position for setting the combination of the lock; the relation of the parts being such that a positioning of said outward stop projections of the inner ring with relation to the co-acting notched portions of the outer ring will position the recesses in the inner marginal wall of the inner ring with relation to the locking point on the periphery of the outer ring, thus permitting a change in the combination.

11. In an improved lock, the combination of a bolt-receiving member having a longitudinal cylindrical bore leading from its interior to its exterior, and a bolt-carrying member having a slotted portion concentric with said cylindrical bore, of a bolt mounted within said bore, and having in its periphery a longitudinal notched portion, annular locking members located within the slotted portion of the bolt-receiving member and rotatably surrounding the bolt, said annular lock members being provided with a plurality of internal notches, a key carried by said bolt and adapted for partial reception in said longitudinal notched portion of the bolt, and for registration with certain of the internal notches of the annular lock members, and means coöperating with said lock members and carried by the bolt-receiving member for indicating when the lock members have been properly set, so that the key will fall within certain of the internal notches of the annular lock members and permit the bolt to be rotated and axially shifted; said lock members having a plurality of transverse positioning notches on their outer peripheral edges, and the bolt carrying member having a plurality of sockets opening into the slotted portion; resilient means carried within said sockets, dogs extending into certain of the sockets and bearing upon the resilient means, whereby the dogs will be normally urged outwardly and held in engagement with the outer peripheral edges of the annular lock members; said key having at its ends angularly disposed extremities, which extremities engage resilient means in other of said sockets, whereby the key is kept in close relation with the periphery of the bolt.

12. An improved lock, comprising a key, a member capable of rotation and axial shifting, a relatively fixed member surrounding the same, said relatively fixed member being adapted to accommodate the key and the first named member being formed to co-act with said key to prevent rotation of said first named member; and a plurality of annular lock members mounted on said first named member and coöperating with the key; one of said annular lock members comprising two parallelly disposed ring members concentric with and within an outer ring member; means co-acting with the outer periphery of one of the parallelly disposed ring members and with the inner periphery of said outer ring member, whereby said rings are held in frictional engagement with each other; and means on the periphery of the other of said parallelly disposed ring members for detachably joining same to a portion of the inner periphery of said outer ring member; each of said lock members having a recess adapted to accommodate movement of said key to release said first named member, and means detachably joined to said first named member and co-acting with said relatively fixed member to limit the axial shifting of same.

13. An improved lock, comprising a key, a member capable of rotation and axial shifting, a relatively fixed member surrounding the same, said relatively fixed member being adapted to accommodate the key and the first named member being formed to co-act with said key to prevent rotation of said first named member; and a plurality of annular lock members mounted on said first named member and coöperating with the key; one of said annular lock members comprising two parallelly disposed ring members concentric with and within an outer ring member; means co-acting with the outer periphery of one of the parallelly disposed ring members and with the inner periphery of said outer ring member, whereby said rings are held in frictional engagement with each other; and means on the periphery of the other of said parallelly disposed ring members for detachably joining same to a portion of the inner periphery of said outer ring member; each of said lock members having a recess adapted to accommodate movement of said key to release said first named member, and means detachably joined to said first named member and co-acting with said relatively fixed member to limit the axial shifting of same; said last named means comprising outward stop projections co-acting with complementary notched portions on the inner periphery of said outer ring member.

14. In an improved lock, the combination of a bolt-receiving member having a longitudinal cylindrical bore leading from its interior to its exterior, and a bolt-carrying member having a slotted portion concentrically with said cylindrical bore, of a bolt mounted within said bore, and having in its periphery a longitudinal notched portion, annular lock members located within the slotted portion of the bolt-receiving member and rotatably surrounding the bolt, said annular lock members being provided with a plurality of notches, a key carried by said bolt and adapted for partial reception in said longitudinal notched portion of the bolt, and for registration with certain of the notches of the annular lock members, and means coöperating with said lock members and carried by the bolt-receiving member for indicating when the lock members have been properly set, so that the key will fall within certain of the notches of the annular lock members and permit the bolt to be rotated and axially shifted; one of said annular lock members comprising two parallelly disposed ring members concentric with and within an outer ring member; means co-acting with the outer periphery of one of the parallelly disposed ring members and with the inner periphery of said outer ring member, whereby said rings are held in frictional engagement with each other; and means on the periphery of the other of said parallelly disposed ring members for detachably joining same to a portion of the inner periphery of said outer ring member.

15. In an improved lock, the combination of a bolt-receiving member having a longitudinal cylindrical bore leading from its interior to its exterior, and a bolt-carrying member having a slotted portion concentric with said cylindrical bore, of a bolt mounted within said bore, and having in its periphery a longitudinal notched portion, annular lock members located within the slotted portion of the bolt-receiving member and rotatably surrounding the bolt, said annular lock members being provided with a plurality of notches, a key carried by said bolt and adapted for partial reception in said longitudinal notched portion of the bolt, and for registration with certain of the notches of the annular lock members, and means coöperating with said lock members and carried by the bolt-receiving member for indicating when the lock members have been properly set, so that the key will fall within certain of the notches of the annular lock members and permit the bolt to be rotated and axially shifted; one of said annular lock members comprising two parallelly disposed ring members concentric with and within an outer ring member; means co-acting with the outer periphery of one of the parallelly disposed ring members and with the inner periphery of said outer ring member, whereby said rings are held in frictional engagement with each other; and means on the periphery of the other of said parallelly disposed ring members for detachably joining same to a portion of the inner periphery of said outer ring member; said last named means comprising outward stop projections co-acting with complementary notched portions on the inner periphery of said outer ring member; and a second of said annular lock members comprising concentric outer and inner ring members, said inner ring member having a plurality of outward stop projections co-acting with notched portions on the inner marginal wall of the outer ring member; and the outer peripheries of the outer ring members of said first and second named annular lock members being transversely notched; and the said inner ring members of the said first and second annular lock members being provided with recessed portions on the inner marginal walls of same, one of said recesses in each of said rings being deep enough to accommodate the key.

In testimony whereof I have signed my name to this specification in the presence of two subscribing witnesses.

OLIVER M. PADDLEFORD.

Witnesses:
J. SHUTT,
MILDRED LEACH.